United States Patent
Bonatti et al.

(10) Patent No.: US 6,938,753 B2
(45) Date of Patent: Sep. 6, 2005

(54) TRANSFER UNIT FOR CONTAINERS

(75) Inventors: Davide Bonatti, Mantova (IT); Enrico Galimberti, Porto Mantovano (IT); Stefano Cavallari, Bologna (IT)

(73) Assignee: Azionaria Costruzioni Macchine Automatiche A.C.M.A. S.p.A., Bologna (IT)

( * ) Notice: Subject to any disclaimer, the term of this patent is extended or adjusted under 35 U.S.C. 154(b) by 0 days.

(21) Appl. No.: 10/668,180

(22) Filed: Sep. 24, 2003

(65) Prior Publication Data

US 2004/0065525 A1 Apr. 8, 2004

(30) Foreign Application Priority Data

Oct. 8, 2002 (IT) ................................. BO2002A0632

(51) Int. Cl.[7] ............................................. B65G 25/00
(52) U.S. Cl. ............................. 198/470.1; 198/474.1
(58) Field of Search ..................... 198/470.01, 471.1, 198/474.1, 476.1, 803.7

(56) References Cited

U.S. PATENT DOCUMENTS 2,681,135 A * 6/1954 Vierling .................. 198/803.7
5,125,498 A * 6/1992 Meyn ...................... 198/476.1

FOREIGN PATENT DOCUMENTS

| DE | 19512515 | 5/1996 |
| FR | 2766166 | 1/1999 |
| WO | 03072466 | 9/2003 |

* cited by examiner

Primary Examiner—Joseph Valenza
(74) Attorney, Agent, or Firm—Harbin King & Klima

(57) ABSTRACT

Containers are transferred from a first conveyor operating at a first height to a second conveyor operating at a second height by a rotary unit equipped with a plurality of grippers designed to take up and support each successive container by the neck. The grippers are carried by respective slides mounted to corresponding vertical guide elements making up the main frame of the unit, on which they are made to move up and down cyclically by a first roller following a first track that extends around a fixed C-shaped tubular element, and by a second roller running on a second track presented by the top surface of a sector rail placed with the concave side directed toward the lateral opening in the C-shaped tubular element. The tubular element is easily replaced in the event of a size changeover.

17 Claims, 5 Drawing Sheets

TRANSFER UNIT FOR CONTAINERS

BACKGROUND OF THE INVENTION

The present invention relates to a transfer unit for containers.

More exactly, the present invention is applicable advantageously to machines for filling and capping containers generally considered, and in particular, bottles taken up from a first conveyor coinciding for example with the outfeed of a filler or capper, and transferred to a second conveyor on which they advance toward a downstream machine, for instance a labeler.

In prior art systems, bottles leaving the first conveyor will be restrained generally by the neck, whilst the second conveyor operates at a height dictated by the downstream machine and presents an entry portion adjustable for height in such a way as to accommodate variations in the longitudinal dimension of different bottles.

This means in practice that the entry portion of the second conveyor is inclined in the manner of a chute, and in certain cases the resulting angle may be unacceptably steep, so that the bottles cannot be conveyed properly or remain balanced.

The object of the present invention is to provide a transfer unit that will overcome the drawback in question by ensuring bottles are directed correctly and safely onto the second conveyor.

SUMMARY OF THE INVENTION

The stated object is realized in a transfer unit for containers according to the present invention.

The unit disclosed comprises means by which to grip and hold single containers take up from a first conveyor operating at a first height, and feed means by which the gripping means are advanced along a predetermined transfer path extending between the first conveyor and a second conveyor operating at a second height.

Also forming part of the unit are means by which to bring about a controlled variation in the height of the gripping means during their passage along the predetermined transfer path.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
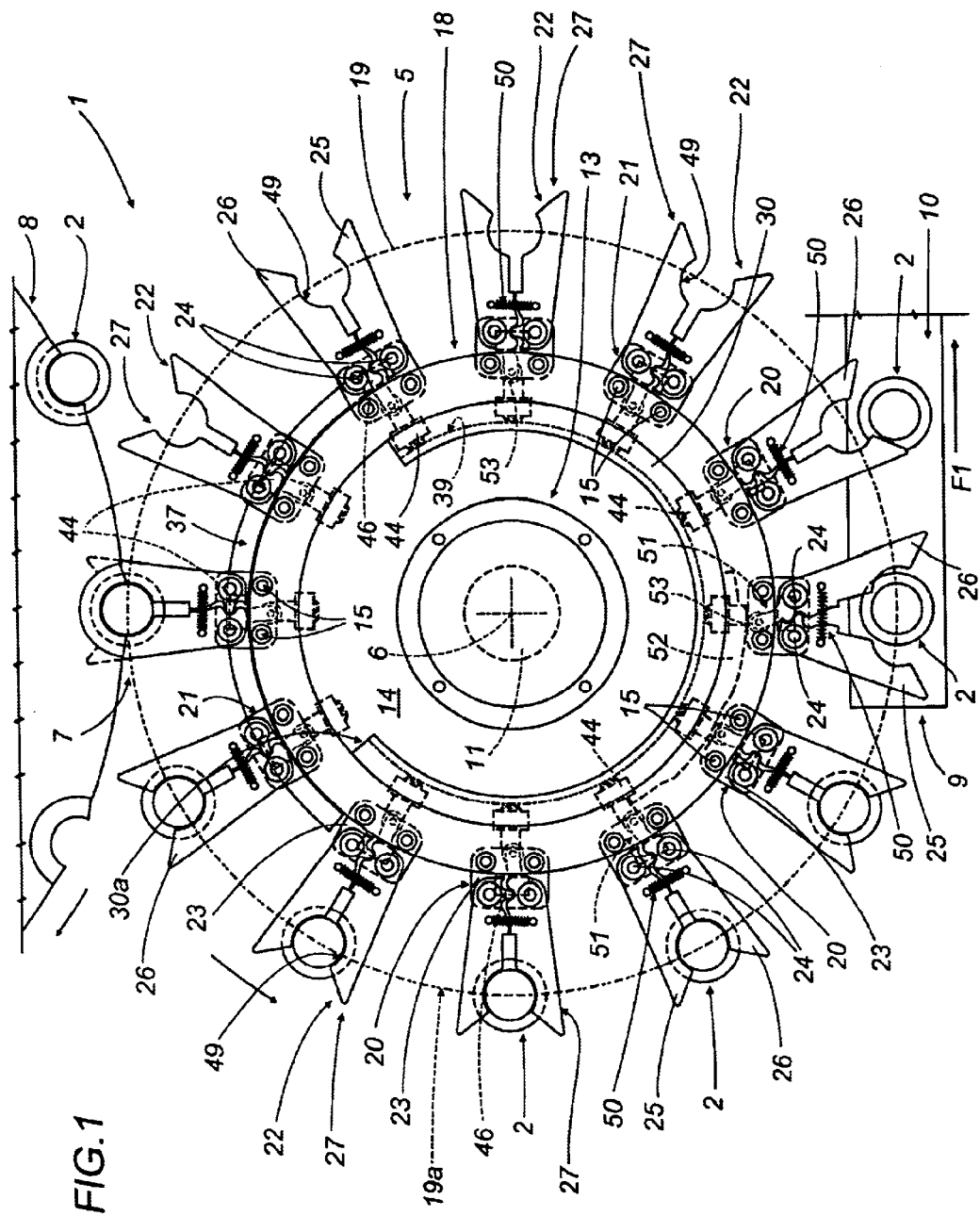
FIG. 1 shows a portion of a bottling line for containers, comprising a transfer unit according to the present invention, illustrated in a schematic plan view
Figure 2:
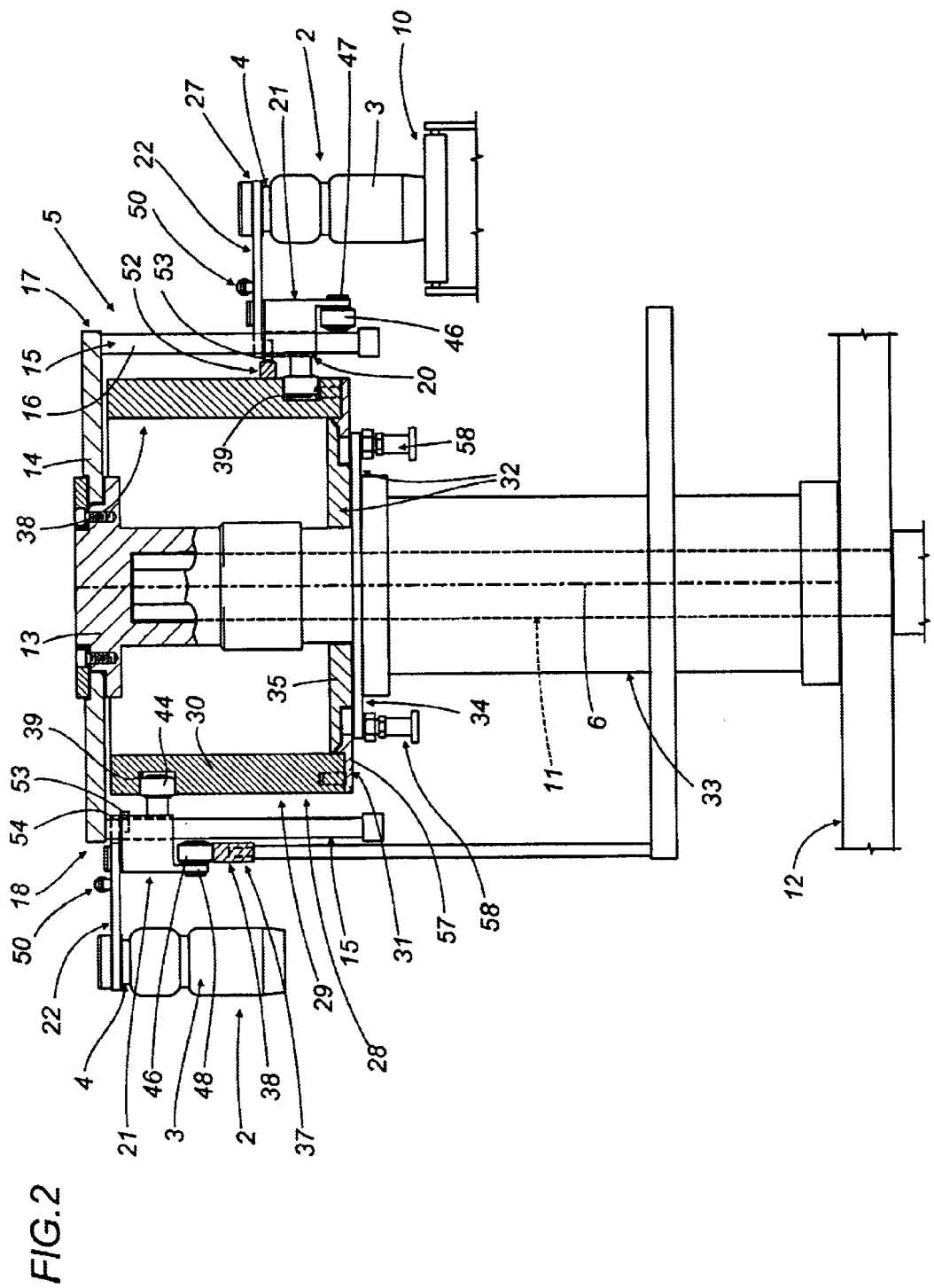
FIG. 2 shows the unit of FIG. 1 in a schematic elevation view, with parts illustrated in section.
Figure 3:
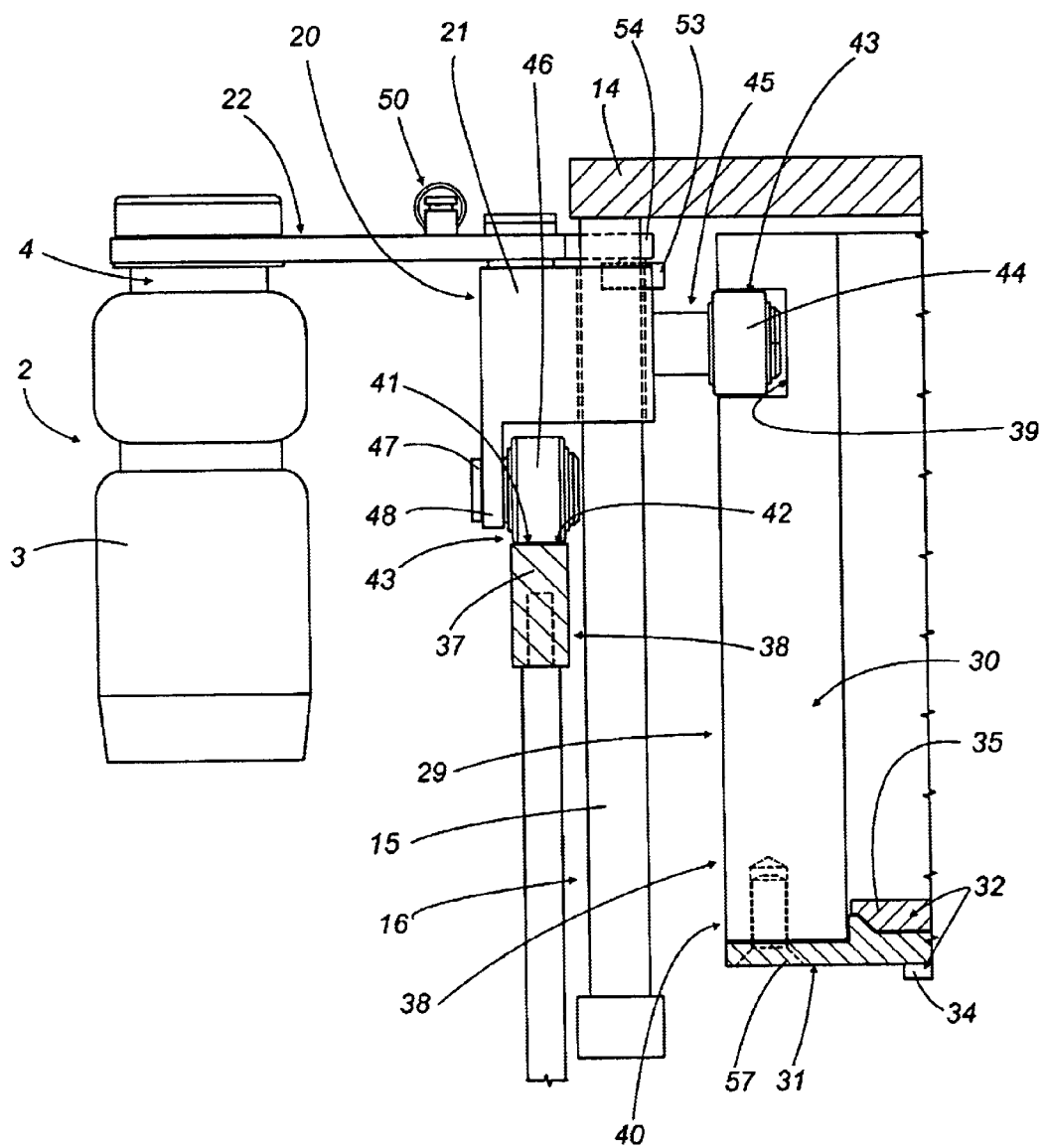
FIG. 3 is an enlarged detail of FIG. 2.

With reference to FIG. 1 of the accompanying drawings, 1 denotes a portion of a bottling line for filling containers 2, each presenting a body 3 and a neck 4 (FIGS. 2 and 3).

The line 1 comprises a transfer unit 5 rotatable about a vertical axis 6, turning counterclockwise as seen in FIG. 1, through a receiving station 7 at which the selfsame unit takes up a succession of containers 2 from a first rotary conveyor 8 turning clockwise about at axis (not illustrated) disposed parallel to the main axis 6.

The function of the unit 5 is to transfer the containers 2 to a release station 9 coinciding with a second linear conveyor 10 advancing substantially tangential to the unit 5 in a direction denoted F1, by which the containers 2 are carried toward a further station (not illustrated) of the bottling line 1.

The transfer unit 5 comprises a vertical shaft 11 extending upward from a bed 12 concentrically with the main axis 6. The shaft 11 carries a flange 13 at the free top end, also a disc element 14 mounted to the flange and furnished around the periphery with a plurality of angularly equispaced pairs 15 of vertical guide elements 16 aligned on respective axes parallel to the main axis 6, of which the free ends are directed toward the bed 12. The flange 13, the disc 14 and the guide elements 16 combine to establish a moving frame 17 and together constitute feed means 18 by which the containers 2 are carried along a path 19 consisting in a closed loop and including a transfer path 19a that extends from the receiving station 7 to the release station 9.

Figure 5:
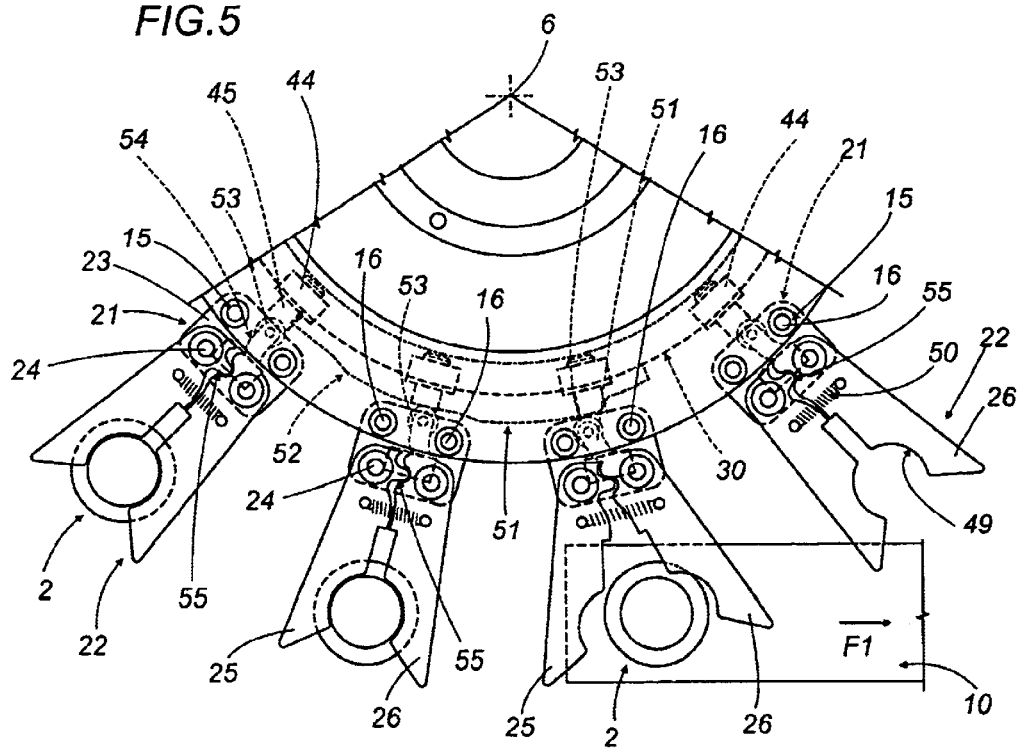
FIG. 5 is an enlarged detail of FIG. 1, from which certain parts are omitted.

Associated with each pair 15 of guide elements 16 are vertically slidable means 20 that comprise a slide 21 carrying means 22 by which to hold and support a single container 2. More exactly, the top face 23 of the slide 21 presents a pair of vertical pivots 24 (FIGS. 1 and 5) serving to support and enable the angular movement of a pair of jaws 25 and 26 functioning as means 27 by which to grip the neck 3 of a single container 2.

As discernible in FIGS. 2 and 3, the transfer unit 5 further comprises means 28 by which to vary the height of the jaws in such a way as will render them capable of movement, more exactly, between a first higher level at which the containers 2 are taken up at the receiving station 7, and a second lower level at which the containers 2 are deposited at the releasing station 9.

Figure 6:
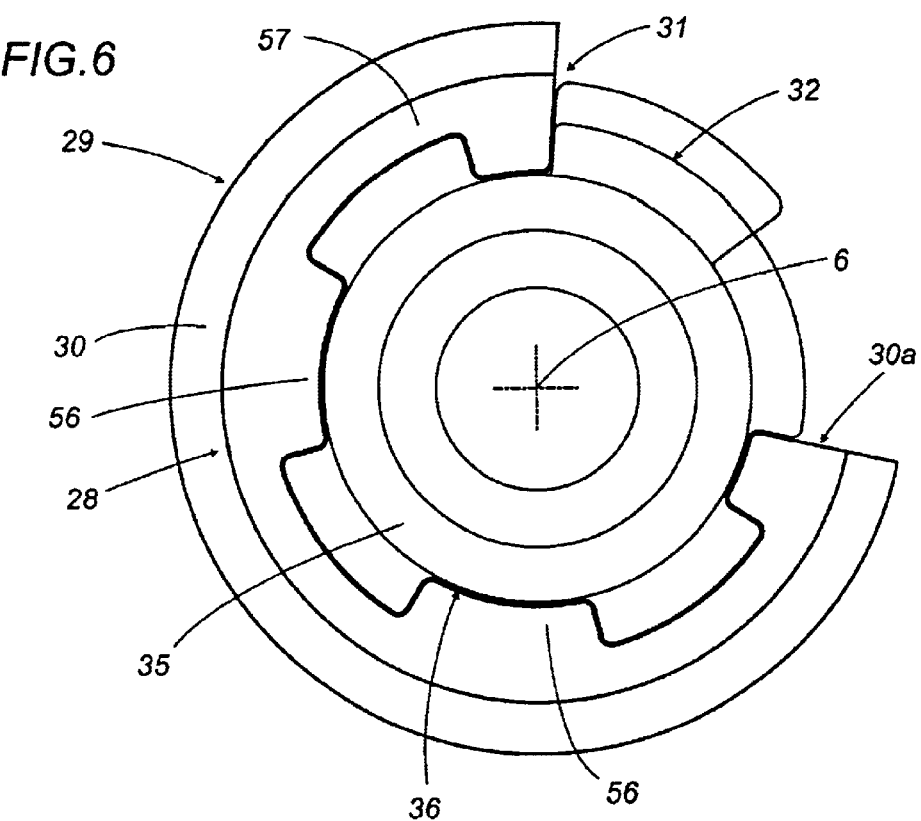
FIGS. 6 and 7 are plan views showing a detail of FIG. 1 in two different operating configurations.
Figure 7:
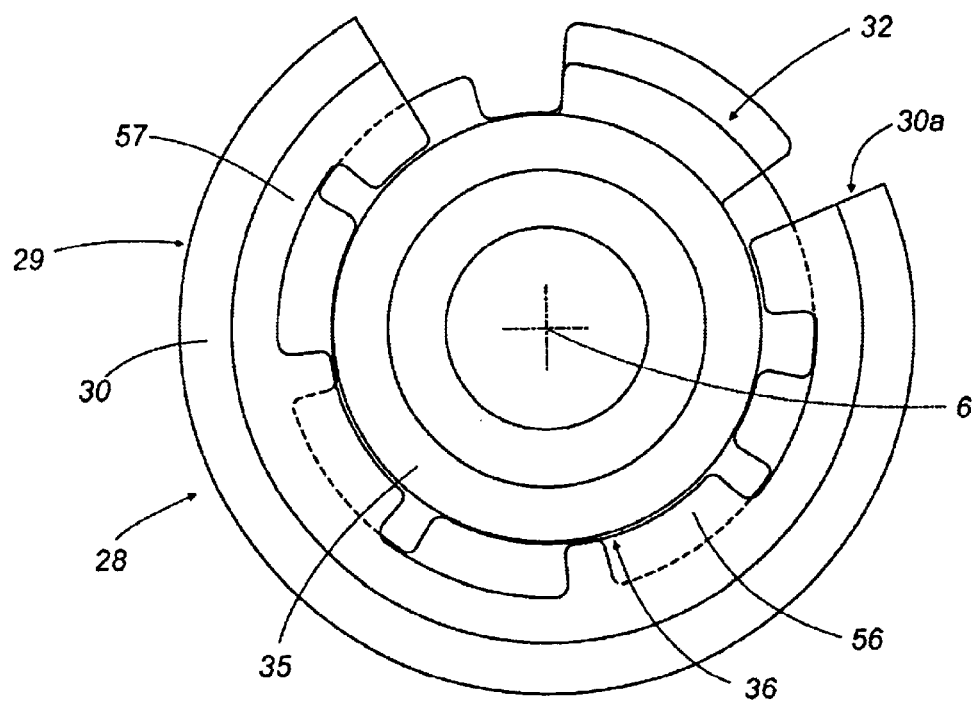

The aforementioned height variation means 28 include means 29 by which to guide the movement of the slides 21, consisting in a tubular element 30 that presents a C-shaped cross-sectional profile and a longitudinal opening 30a and is centered on the vertical shaft 11. The bottom part of this same tubular element 30 is furnished with respective quick coupling and fastening means 31 operating in conjunction with fastening means 32 afforded by a sleeve 33 secured to the bed 12 coaxially with the shaft 11, which comprise a circular plate 34 and a ring 35 with radial lugs 36 positioned above the plate (FIGS. 6 and 7).

The guide means 29 also comprise a sector 37, coinciding with an arc to a circle centered on the shaft 11, which is positioned with the concave side directed toward the opening 30a and mounted rigidly to the bed 12 in a manner not illustrated.

More exactly, the aforementioned guide means 29 comprise respective cam profile means 38 composed of a first track 39 extending around the outer cylindrical surface 40 of the tubular element 30, and a second track 41 afforded by the top surface of the circular sector 37. The two tracks 39 and 41 are substantially complementary one to another, and present a combined length enabling them to extend around the full 360° compass of the looped path 19 aforementioned, including the transfer path 19a along which the holding and supporting means 22 are caused to advance.

As discernible in FIGS. 2 and 3, each slide 21 comprises relative engagement means 43 interacting with the first and second tracks 39 and 41.

More precisely, the engagement means 43 comprise a first roller 44 mounted freely to the end of a radial pivot 45 projecting from the slide 21 toward the cylindrical surface 40 of the C-shaped tubular element 30, and a second roller 36 mounted freely to a pivot 47 disposed parallel to the pivot 45 first mentioned and carried by an arm 48 extending downward from the slide 21. The first roller 44 is insertable into the first track 39, whilst the second roller 46 runs on the second track 41.

In operation, containers 2 are taken up singly and in succession from the first conveyor 8 at the receiving station 7 by the holding and supporting means 22, positioned at the aforementioned first height. During the course of the passage onto the transfer unit 5, the container 2 is subjected to a radial pushing force that has the effect of opening the jaws 25 and 26 and causing the neck to locate in a seat 49 afforded by the rounded ends of the selfsame jaws 25 and 26, against the resilient action of a spring 50.

In the course of the take-up step, during which the holding and supporting means 22 are positioned at a height substantially level with the neck 4 of a container 2 standing on the first conveyor 8, the slide 21 is supported by the second roller 46 as it runs on the surface 42 of the sector 37, advancing along the transfer path 19a to the point at which the first roller 44 engages with the first track 39 of the tubular element 30.

With the transfer unit 5 then continuing to turn about the center axis 6, the height of the slide 21 will change as the first roller 44 advances along the profile of the corresponding track 39.

Figure 4:
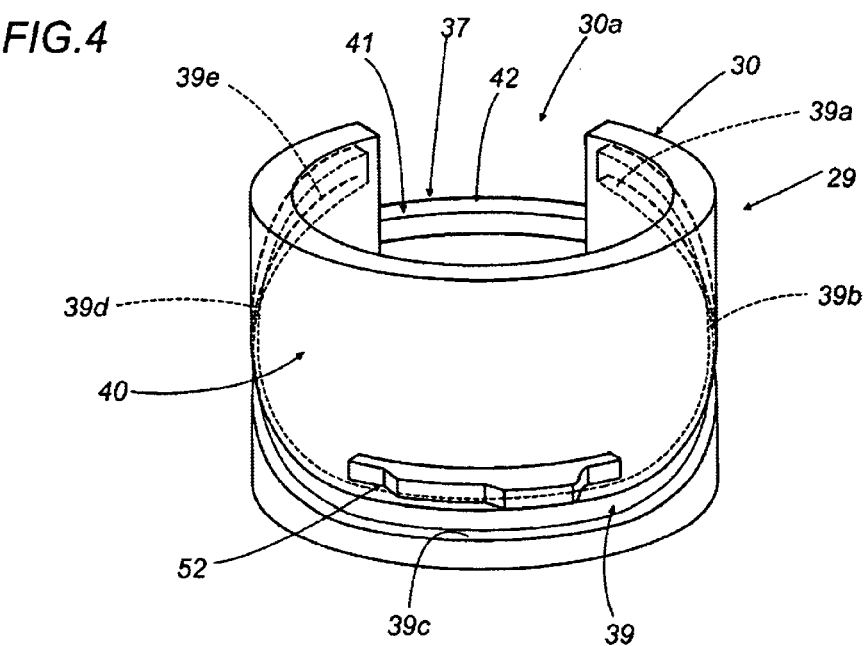
FIG. 4 shows a detail of FIG. 2, illustrated in perspective.

As illustrated in FIG. 4, the cam profile of the first track 39 presents a first substantially straight portion 39a engaged by the first roller 44 with the second roller 46 still advancing along the relative track 41, followed by a first descending inclined portion 39b engaged by the first roller 44 after the second roller 46 has separated from the surface 42 of the sector 37, and next in sequence, a substantially horizontal portion 39c along which the holding and supporting means 22 are positioned at a height substantially level with the neck 4 of a container 2 standing on the second conveyor 10.

The transfer unit 1 further comprises actuating means 51 by which to produce the opening movement of the holding and supporting means 22, consisting in a cam sector 52 fixed to the outer cylindrical surface 40 of the tubular element 30 and designed to interact with a following roller 53 carried by the end of an arm 54 associated with one jaw 26.

The profile of the cam sector 52 is such as to engage the following roller 53 and cause the jaw 26 in question to rotate about the relative pivot 24. The jaw 26 in turn presents a tooth profile 55 by which the other jaw 25 is caused to rotate about the relative pivot 24 in the opposite direction.

Following the step by which the container 2 is released to the second conveyor 10, the holding and supporting means 22 continue to advance along the circular path 19, the following roller 53 separates from the cam sector 52 and the jaws 25 and 26 are drawn together by the spring 50.

Passing beyond the horizontal portion 39c of the track 39, the first roller 44 passes onto a second ascending inclined portion 39d and the slide 21 is caused to return upwards along the respective guide elements 16, bringing the holding and supporting means 22 up to a height level with the neck 4 of a container 2 advancing on the first conveyor 8.

During this same step, the first roller 44 passes along a third and final straight portion 39e of the first track 39, whilst the second roller 46 regains the sector 37 and begins to advance along the first part of the top surface 42.

Importantly, the transfer unit 5 according to the present invention presents the advantage of being readily adaptable to any size of container 2, since it allows a rapid replacement of the cylindrical tubular element 30 and sector 37. After an initial twisting movement serving to release it from the fastening means 32 rigidly associated with the shaft 11, the tubular element 30 can be removed with ease, thanks in particular to the C-shaped geometry described and illustrated, by inducing a sideways movement transverse to the axis 6 of the shaft 11.

Accordingly, to fit a new tubular element 30 with a first track 39 of different profile, the element is first translated radially into a position of coaxial alignment with the shaft 11. Thereafter, the tubular element 30 is shifted axially in such a manner that the internally projecting lugs 56 of a C-shaped sector 57 presented by the bottom of the tubular element 30 are caused to locate between the radial lugs 36 mentioned previously and register against the plate 34, thereby assuming the position illustrated in FIG. 6.

Finally, a twisting movement left or right will cause the lugs 56 to lodge between the plate 34 and the ring 35, thereby locking the tubular element 30 to the shaft 11 as illustrated in FIGS. 2 and 7. Any risk of the element twisting loose accidentally will be prevented by retaining means, illustrated as spring-loaded plungers 58 disallowing relative movement between the plate 34 and the lugs 56.

What is claimed is:

1. A transfer unit for containers, rotatable about a vertical axis and comprising:
    a vertical shaft extending upward from a bed concentrically with the vertical axis;
    at least one set of means by which to take up and hold a relative container leaving a first conveyor positioned at a first height;
    said holding means being associated with respective means, slidable vertically in relation to a frame, which comprise a slide carrying said holding means;
    feed means by which the holding means are caused to advance along a predetermined path extending at least between the first conveyor and a second receiving conveyor positioned at a second height;
    said feed means comprising said frame, said frame constructed and arranged to be set in motion along said predetermined path consisting of a closed loop;
    means operating in conjunction with the holding means, by which the height of the selfsame holding means is varied during the course of their passage along the predetermined path; wherein said means operating in conjunction with the holding means for varying the height of the holding means includes means by which to guide the movement of the slides comprising a generally tubular element centered about the vertical shaft and which presents a C-shaped cross-sectional profile having a longitudinal opening through which the vertical shaft can laterally pass to allow replacement of the means by which to guide the movement of the slides to vary the movement of the slides.

2. A unit as in claim 1, wherein holding means comprise means by which to grip the neck of a container.

3. A unit as in claim 1, comprising a plurality of holding means.

4. A unit as in claim 3, wherein the frame comprises a plurality of pairs of vertical guide elements each associated with respective holding means incorporating gripper means.

5. A unit as in claim 4, wherein said shaft is aligned on said vertical axis, supports and drives the frame, the frame comprising a disc element, mounted to the top end of the shaft and carrying vertical guide elements equispaced angularly around the periphery.

6. A unit as in claim 5, wherein the guide means comprises cam profile means.

7. A unit as in claim 6, wherein cam profile means comprise a first track and a second track substantially complementary one to another, extending in combination around the closed loop path followed by the holding means.

8. A unit as in claim 7, wherein the first track extends around the cylindrical outer surface presented by said tubular element of C-shaped cross section; the tubular element comprising coupling and fastening means operating in conjunction with fastening means afforded by the shaft, whilst the second track is presented by a sector appearing as an arc to a circle positioned with the concave side offered to the lateral opening in the C-shaped tubular element.

9. A unit as in claim 8, wherein the width of the opening presented by the C-shaped tubular element is such that the selfsame element can be distanced from the vertical shaft by displacement in a radial direction.

10. A unit as in claim 1, wherein the slide incorporates engagement means designed to interact with a cam profile means.

11. A unit as claim 7, wherein engagement means comprise a first roller and a second roller passing respectively along the first track and the second track.

12. A unit as in claim 1, wherein the slide comprises a pair of pivots supporting and enabling the angular movement of a pair of jaws providing the gripper means.

13. A unit as in claim 12, wherein at least one of the jaws is associated with respective actuating means designed to produce the opening and/or closing movement of the gripper means.

14. A unit as in claim 13, wherein the actuating means comprise a cam sector, and a following roller mounted to the end of an arm rigidly associated with one of the two jaws.

15. A unit as in claim 10, wherein engagement means comprise a first roller and a second roller passing respectively along the first track and the second track.

16. A unit as in claim 10, wherein the slide comprises a pair of pivots supporting and enabling the angular movement of a pair of jaws providing the gripper means.

17. A unit as in claim 1 and further comprising a bayonet joint for positioning and fastening the means by which to guide the movement of the slides.

* * * * *